United States Patent
Mo

(10) Patent No.: US 10,354,403 B2
(45) Date of Patent: Jul. 16, 2019

(54) DEVICE FOR CAPTURING IMAGES OF EYEWEAR FROM A FORCED PERSPECTIVE

(71) Applicant: Albert Mo, Scarborough (CA)

(72) Inventor: Albert Mo, Scarborough (CA)

(*) Notice: Subject to any disclaimer, the term of this patent is extended or adjusted under 35 U.S.C. 154(b) by 90 days.

(21) Appl. No.: 15/691,979

(22) Filed: Aug. 31, 2017

(65) Prior Publication Data
US 2019/0066319 A1 Feb. 28, 2019

(51) Int. Cl.
| | | |
|---|---|---|
| G06T 7/60 | (2017.01) | |
| G06T 7/73 | (2017.01) | |
| H04N 5/232 | (2006.01) | |
| G02C 13/00 | (2006.01) | |
| G02C 9/00 | (2006.01) | |

(52) U.S. Cl.
CPC ............ *G06T 7/60* (2013.01); *G02C 13/003* (2013.01); *G02C 13/005* (2013.01); *G06T 7/73* (2017.01); *H04N 5/23222* (2013.01); *G02C 9/00* (2013.01); *G06T 2207/30208* (2013.01)

(58) Field of Classification Search
CPC .......................... G02C 13/005; G02C 13/003
See application file for complete search history.

(56) References Cited

U.S. PATENT DOCUMENTS

| | | | | |
|---|---|---|---|---|
| 4,625,418 A | * | 12/1986 | Joncour | G02C 13/005 33/200 |
| 2007/0195266 A1 | * | 8/2007 | Kubitza | G02C 13/003 351/204 |
| 2010/0064533 A1 | * | 3/2010 | Miyashita | G01B 5/20 33/200 |
| 2010/0231710 A1 | * | 9/2010 | Sayag | G02C 13/003 348/135 |
| 2015/0002807 A1 | * | 1/2015 | Haddadi | G02C 11/10 351/155 |
| 2015/0077546 A1 | * | 3/2015 | Videcoq | G02C 13/003 348/135 |
| 2016/0327814 A1 | * | 11/2016 | Marie | G02C 13/005 |
| 2017/0223279 A1 | * | 8/2017 | Mueller | H04N 9/3179 |
| 2017/0269384 A1 | * | 9/2017 | Tiemann | G02C 13/005 |
| 2018/0224675 A1 | * | 8/2018 | Gueu | G01M 11/0264 |

* cited by examiner

*Primary Examiner* — Rebecca A Volentine
(74) *Attorney, Agent, or Firm* — Aaron Edgar

(57) ABSTRACT

A device is provided for obtaining an image of eyewear from a forced perspective such that measurements of the eyewear can be obtained from the image. The device includes a horizontal alignment indicator and a vertical alignment indicator that each span across two non-coplanar surfaces. When an image is captured from the proper predefined horizontal and vertical positions with respect to the device, the horizontal and vertical indicators will align across the two non-coplanar surfaces. The device can also include a distance indicator. The device can be constructed from a kit that can be easily mailed in a flat envelope. A mobile device can be configured to assist with capturing the measurement image and provide feedback to assist the user to properly position the mobile device to obtain the measurement image.

20 Claims, 8 Drawing Sheets

DEVICE FOR CAPTURING IMAGES OF EYEWEAR FROM A FORCED PERSPECTIVE

FIELD

The present disclosure relates generally to a device that assists with capturing an image. More particularly, the disclosure relates to a device that can be used to obtain an image of eyewear from a forced perspective to allow measurements of the eyewear to be determined from the image.

BACKGROUND

Making additions or modifications to eyewear, such as designing clip-ons or lens coatings to fit a particular piece of eyewear, will often require accurate measurements of that eyewear. Obtaining these measurements often requires submitting the eyewear to the manufacturer of the custom clip-on or lens coating to ensure a proper fit. During this time, the eyewear is unavailable to the owner. Where these additions or modifications are to be made without access to the corresponding eyewear, accurate means of measuring the eyewear and transmitting the measurements will be important.

Using an image of eyewear to obtain its measurements can be difficult, can require expensive equipment, and can also be inaccurate and prone to error. Variance in the position of a camera obtaining the image relative to the eyewear itself will create distortions in the image because of perspective and foreshortening. Capturing the image from a predefined position relative to the eyewear can create a standardized image which greatly adds to the ease of obtaining measurements from that image. To take a standardized image where measurements of the eyewear can be readily obtained, the position of the camera relative to the eyewear should be standardized as well. Existing means of establishing a standardized positioning between a camera and an object being photographed include rigs to which the camera and the object being measured can be attached. However, these rigs can be expensive, large and lack portability.

Alternatively, obtaining measurements of the eyewear by traditional means, such as using rulers or other measuring devices, can be error prone when left to an unsophisticated user. Therefore, a need exists for a device that can assist the positioning of a camera towards a predefined position relative to the eyewear so that a standardized image can be obtained to assist with conveying measurement information about the eyewear. Preferably, the needed device is light, portable, and helps to provide accurate measurements.

SUMMARY

Accordingly, in one aspect a device is provided for obtaining an image of eyewear and the image is used for obtaining measurements of the eyewear. The device comprises a sheet having a front surface, the front surface having at least one horizontal alignment indicator (HAI); and at least one vertical alignment indicator (VAI) marked on the front surface, and the device includes an eyewear attachment to position the eyewear adjacent to the front surface of the sheet. The device can include a second surface that is not co-planar with the front surface, and the horizontal alignment indicator (HAI) can have a first HAI line on the front surface and a second HAI line on the second surface, and wherein the first HAI line and the second HAI line of the horizontal alignment indicator are any one of parallel or collinear in the image when captured from a predefined horizontal alignment with respect to the device. The second surface can be in front of or behind the front surface. Similarly, the vertical alignment indicator (VAI) can have a first VAI line on the front surface and a second VAI line on the second surface that appear in alignment in the image when captured from a predefined vertical alignment with respect to the device.

The horizontal alignment indicator and the vertical alignment indicator can be formed by a protrusion extending from the front surface of the sheet. The horizontal alignment indicator can be the end of the protrusion which obscures the protrusion in a horizontal axis in the image when captured from a predefined horizontal alignment with respect to the device, and the vertical alignment indicator can be the end of the protrusion which obscures the protrusion in a vertical axis in the image when captured from a predefined vertical alignment with respect to the device.

In some aspects, the device can be bent at a fixed angle and include at least one distance indicator. The distance indicator can comprise a first distance line and a second distance line marked on the front surface, the first distance line on one side of the bend and the second distance line on an opposing side of the bend, the first distance line and second distance line converge towards the bend, wherein the first distance line and the second distance line are any one of parallel or collinear in the image when captured from a predefined distance from the device. The device can also include an angle-fixation device that secures the bend at the fixed angle. The angle-fixation device can include a brace having a first end portion and a second end portion opposite the first end portion, the first end portion attached to the sheet at a first predetermined position on one side of the bend and the second end portion attached to the sheet at a second predetermined position on an opposite side of the bend. In some aspects, the eyewear attachment can include two apertures formed in the sheet, each of the apertures on opposing sides of the bend, each of the apertures shaped to receive a corresponding arm of the eyewear.

According to another aspect, a kit for assistance with obtaining an image of eyewear can be provided to assist with capturing the image for obtaining measurements of the eyewear. The kit comprises a flat sheet, the flat sheet having a front surface, the front surface having at least one horizontal alignment indicator and at least one vertical alignment indicator, and an eyewear attachment to position the eyewear adjacent to the front surface of the sheet. The flat sheet is bendable to a fixed angle, having at least one distance indicator, and an angle-fixation device to maintain a bend of the flat sheet at the fixed angle. The flat sheet can include the angle-fixation device and the angle-fixation device can be removable from the flat sheet.

According to yet another aspect, a method is provided for using a mobile device to obtain a measurement image. The method includes capturing one or more evaluation images using a mobile device having a camera, the evaluation images for evaluating the alignment of the mobile device; evaluating each of the evaluation images using a processor of the mobile device to determine whether any one or more of the horizontal alignment indicator and the vertical alignment indicator are in alignment; obtaining a measurement image from the one or more evaluation images, the measurement image having each of the horizontal alignment indicator and the vertical alignment indicator in alignment; and obtaining a known measurement. In some aspects, the method can further include calculating the measurement of the eyewear, using the processor of the mobile device, using the measurement image and the known measurement. In still other aspects, the method can include sending the measurement image and the known measurement over a network to a computing device wherein the computing device has a processor for calculating the measurement of the eyewear using the measurement image and the known measurement. In yet other aspects, the method can include providing feedback by the mobile device, the feedback to direct movement of the mobile device to have each of the horizontal alignment indicator and the vertical alignment indicator in alignment in at least one of the evaluation images. The feedback can be visual feedback provided by a display of the mobile device, auditory feedback provided by a speaker of the mobile device, haptic feedback provided by a motor of the mobile device. Obtaining the known measurements can include prompting and collecting input of the known measurement at the mobile device, such as an A-frame measurement, for example.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments.

Figure 1A:
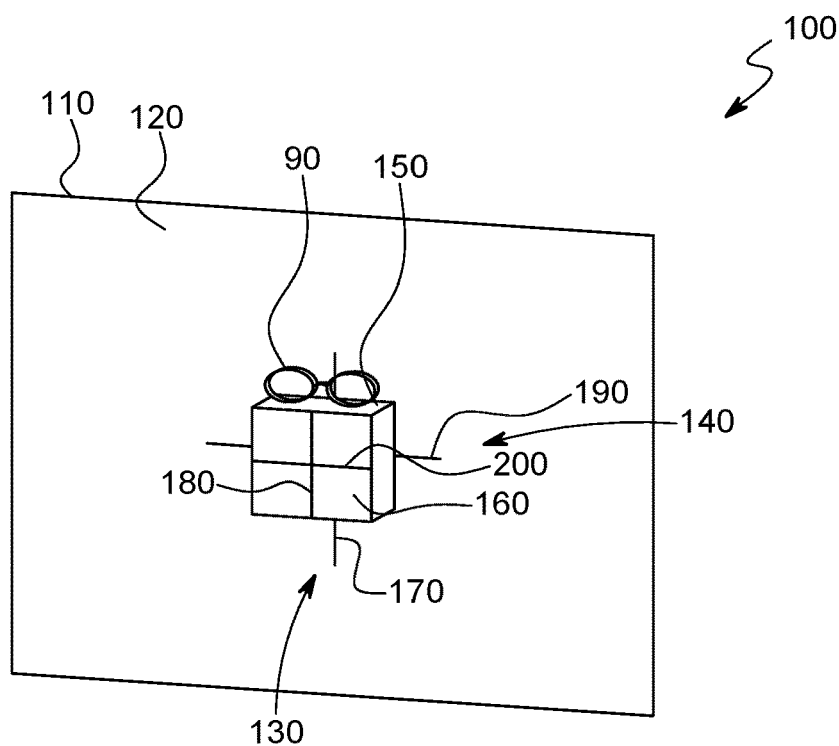
FIG. 1A is a front perspective view of a device for assisting with obtaining images of eyewear from forced perspective.
Figure 1B:
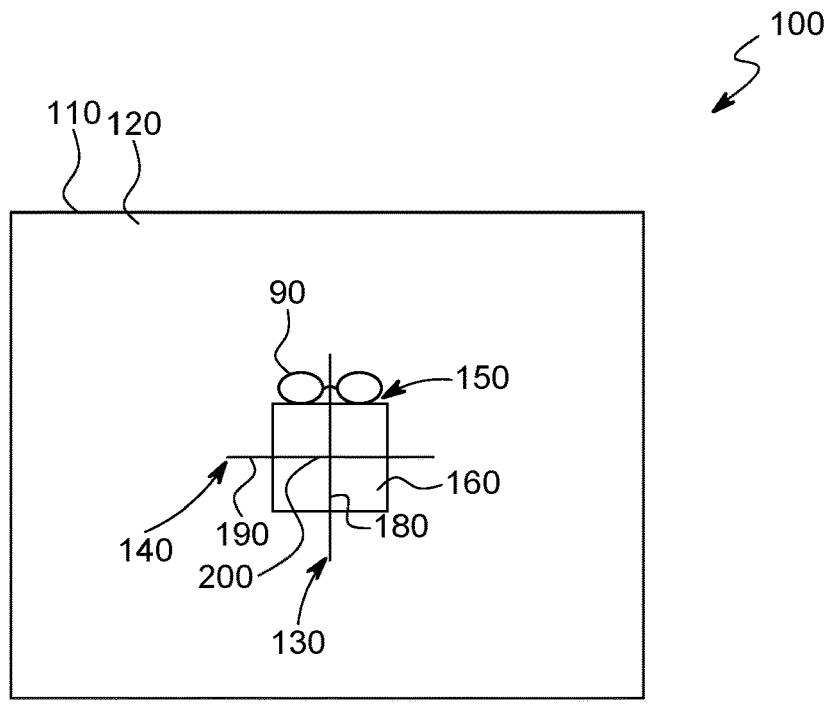
FIG. 1B is a front view of the device of FIG. 1A.
Figure 1C:
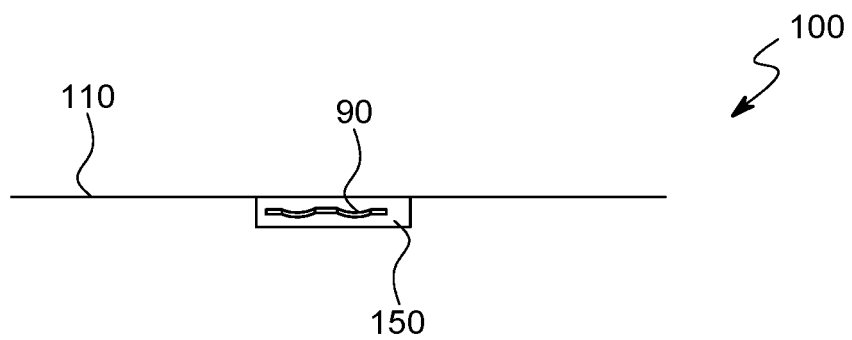
FIG. 1C is a top view of the device of FIG. 1A.

Reference will now be made to the drawings wherein like numerals refer to like parts throughout. Reference is first made to FIGS. 1A-C which illustrate a device 100 for assisting with obtaining an image of eyewear 90. FIG. 1A is a front perspective view of device 100, FIG. 1B is a front view of device 100, and FIG. 1C is a top view of device 100. Device 100 has a front surface 120. The front surface 120 has a horizontal alignment indicator 130, a vertical alignment indicator 140, and an eyewear attachment 150 which attaches eyewear 90 to device 100. Indicators 130, 140 can be marked on front surface 120, such as by writing, etching, defined by fold lines on front surface 120, or otherwise applied to front surface 120 of device 100.

Device 100 is preferably constructed from a sheet 110 having front surface 120 thereon in order to maintain a light-weight construction. The term "sheet" as used herein can refer to any material that provides a planar surface on which indicators 130, 140 can be marked. In some embodiments, sheet 110 can be a rigid cardboard or plastic material. In other embodiments, front surface 120 can be located on another larger object or piece of equipment to allow that object or equipment to provide similar functionality to capture eyewear images.

Device 100 also has a second surface 160 that can be located either in front of, or behind, front surface 120. In the embodiment of FIGS. 1A-C, second surface 160 is located in front of front surface 120. As second surface 160 is not coplanar with front surface 120, the effects of perspective on the horizontal alignment indicator 130 and the vertical alignment indicator 140 are used to orient the image taker into a predefined position relative to device 100 and attached eyewear 90.

Horizontal alignment indicator 130 can be comprised of a first horizontal indicator line 170 located on front surface 120 and a second horizontal indicator line 180 located on second surface 160. Horizontal alignment indicator 130 guides the user to the correct position on the horizontal axis from which to capture the image. When the image of the attached eyewear 90 is captured from the correct predefined position on the horizontal axis relative to device 100, the first horizontal indicator line 170 and the second horizontal indicator line 180 will appear to be collinear in the image, as is shown in FIG. 1B. If the image of the eyewear 90 is captured from any other position on the horizontal axis relative to device 100 then the first horizontal indicator line 170 and the second horizontal indicator line 180 will appear as two disjointed lines with respect to each other, for example, as in FIG. 1A.

Vertical alignment indicator 140 can be comprised of a first vertical indicator line 190 located on the front surface 120 and a second vertical indicator line 200 located on second surface 160. Vertical alignment indicator 140 guides the user to the correct position on the vertical axis from which to capture the image. When the image of the attached eyewear 90 is captured from the correct predefined position on the vertical axis relative to device 100 the first vertical indicator line 190 and the second vertical indicator line 200 will appear to be collinear in the image, as is shown in FIG. 1B. If the image of the eyewear 90 is captured from any other position on the vertical axis relative to device 100 then the first vertical indicator line 190 and the second vertical indicator line 200 will appear as disjointed lines with respect to each other, for example, as is shown in FIG. 1A.

Figure 2:
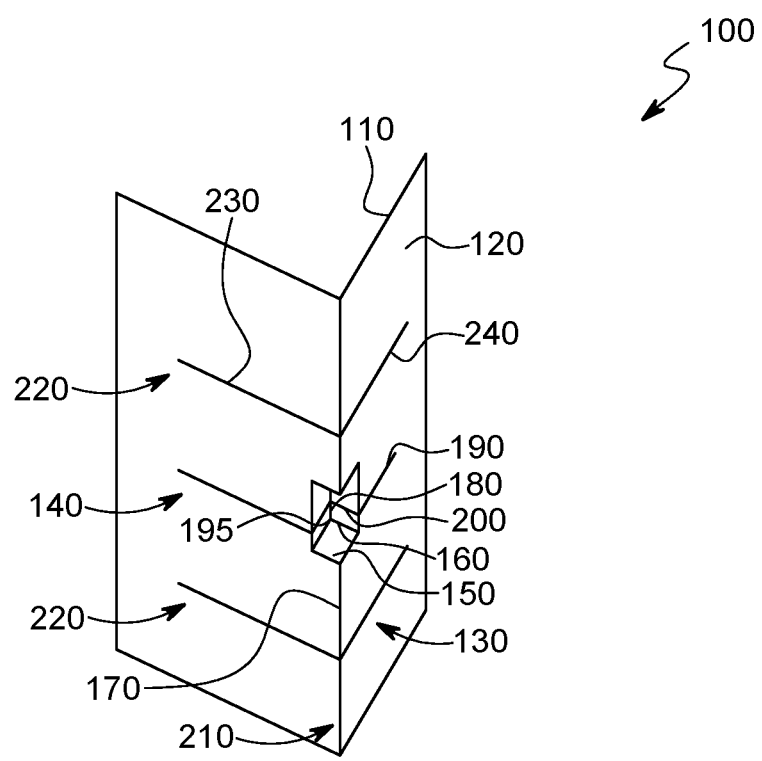
FIG. 2. is a perspective view of an alternative embodiment of the device of FIGS. 1A-C wherein the sheet is bent at a fixed angle and having a distance indicator.

Reference is now made to FIG. 2, which shows a perspective view of another embodiment of device 100 where sheet 110 has a bend 210 which forms a fixed angle in front surface 120. A distance indicator 220 can be located on front surface 120 and can be comprised of a first distance line 230 and a second distance line 240, each on an opposite side of bend 210 on front surface 120. In the current embodiment, there are two distance indicators 220: one along a top portion of front surface 120 and the second along a bottom portion of front surface 120, although only a single distance indicator 220 is required to ascertain whether an image is captured at the correct predefined distance.

Figure 3:
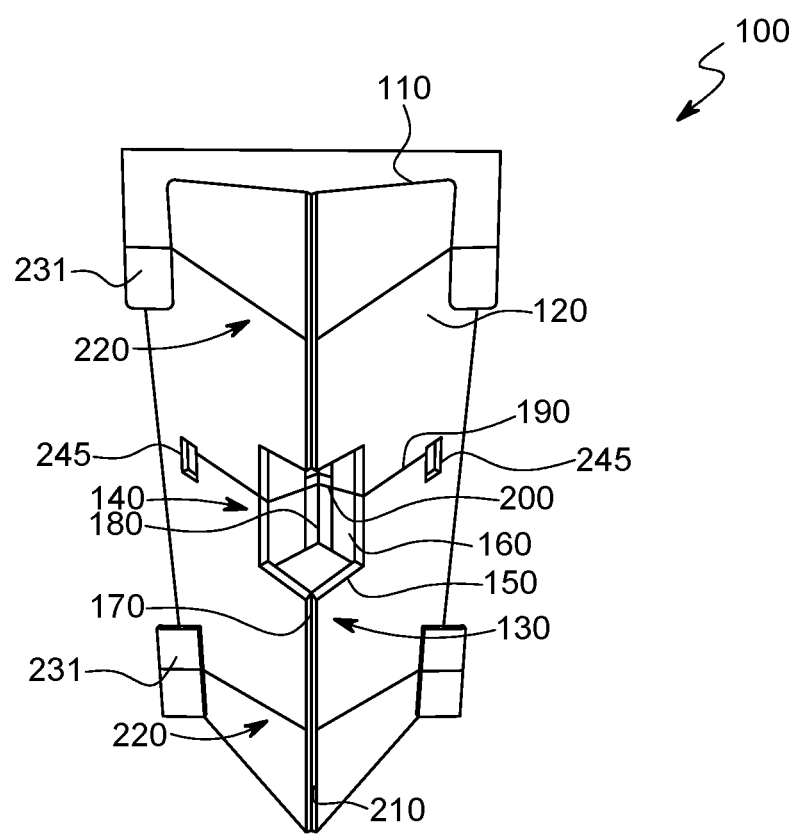
FIG. 3. is a perspective view of an embodiment of the device of FIG. 2 having an angle fixation device.

First distance line 230 and second distance line 240 converge toward bend 210. For example, appearing as a "V-shape" in the top portion of sheet 110 and an inverted "V-shape" in the bottom portion of sheet 110. Based upon the known fixed angle of bend 210 and the angle at which the first distance line 230 and second distance line 240 intersect, first distance line 230 and second distance line 240 will appear collinear or parallel if the image of the eyewear 90 is captured from a point that is the correct predefined distance away from device 100. FIGS. 2 and 3 illustrate the case where first distance line 230 and second distance line 240 converge at bend 210 and will appear collinear when an image is captured from the correct predefined distance.

In the embodiments illustrated in FIG. 2, second surface 160 is located behind front surface 120 and can be formed by making two cuts into sheet 110 across bend 210 and folding the section between the two cuts inwards (inverse to bend 210 to form second surface bend 195). Horizontal alignment indicator 130 can be comprised of first horizontal indicator line 170, which is vertical and may be collinear with bend 210, and second horizontal indicator line 180, which is vertical on second surface 160 and may be collinear with bend 195. In some embodiments, horizontal alignment indicator 130 may be comprised of bend 210 and second surface bend 195 rather than any additional markings or indicators on sheet 110. Horizontal alignment at the correct predefined horizontal position would result in bend 210 and second surface bend 195 being in alignment or collinear. Vertical alignment indicator 140 can comprise first indicator line 190 on front surface 120 and second indicator line 200 on second surface 160.

Reference is next made to FIG. 3, which illustrates a perspective view of another embodiment of device 100 comprising sheet 110 having bend 210. Bend 210 can be secured at a fixed angle by an angle fixation device 231. In the current embodiment, angle fixation device 231 comprises two braces, each with first and second end portions each affixed to sheet 110 on opposite sides of bend 210. In some embodiments, a single brace can be used. Angle fixation device 231 is affixed to sheet 110 at predetermined positions on sheet 110 which are defined by slots in sheet 110 into which angle fixation device 231 may attach with corresponding slots in angle fixation device 231. In an alternate embodiment, angle fixation device 231 may comprise a block having a corner at the fixed angle, which corner may be positioned into bend 210 to secure the fixed angle of bend 210. Other embodiments can use other methods of fixing bend 210 at a fixed angle. In some embodiments sheet 110 can be comprised of a rigid material that can maintain bend 210 at a fixed angle without the use of angle fixation device 231.

Eyewear attachment 150 maintains eyewear 90 in a fixed position relative to device 100. Eyewear attachment can be comprised of a bridge support formed by the edge of sheet 110 where it is folded inwards to provide second surface 160. In the current embodiment, eyewear attachment 150 is further comprised of two apertures 245 formed in sheet 110. Each aperture 245 will be shaped to receive an arm of the eyewear to secure the eyewear in position adjacent to front surface 120 of device 100.

Figure 4A:
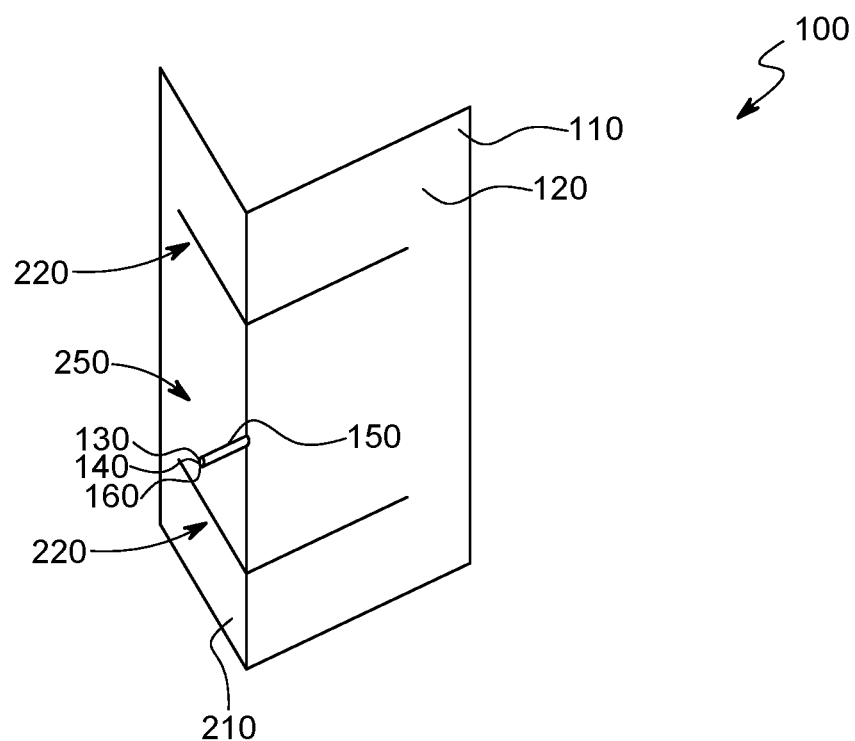
FIG. 4A is a perspective view and FIG. 4B is a top view of an embodiment having a protrusion extending from the front surface.
Figure 4B:
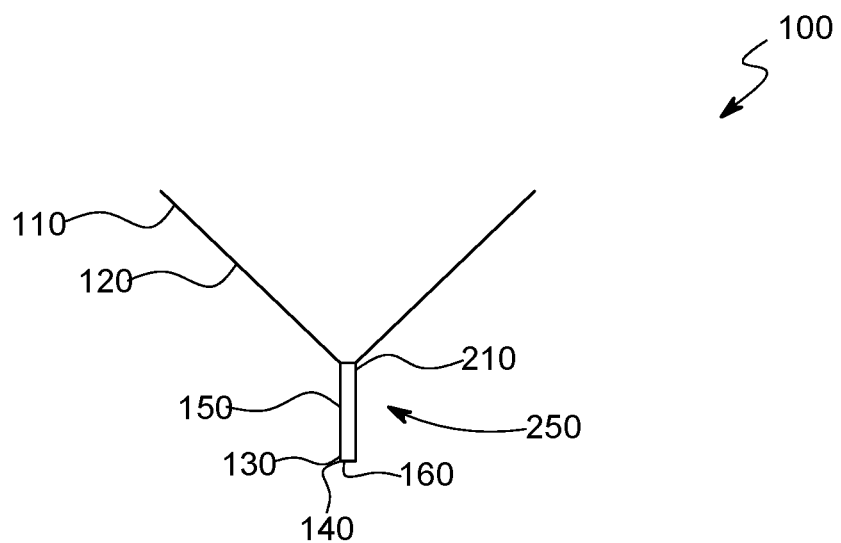

Reference is next made to FIGS. 4A and 4B, which illustrates a perspective view of an alternative embodiment of device 100 in FIG. 4A and a top view of the same embodiment in FIG. 4B. Vertical alignment indicator 140, horizontal alignment indicator 130 and second surface 160 can be formed by protrusion 250. Protrusion 250 extends from front surface 120 of sheet 110. In the illustrated embodiment, protrusion 250 extends from sheet 110 at a point along bend 210. The end of protrusion 250 comprises second surface 160. Horizontal alignment indicator 130 is comprised of second surface 160 which will act to obscure the projecting length of protrusion 250 when viewed from the correct position on the horizontal axis relative to device 100. Vertical alignment indicator 140 is comprised of second surface 160, and when viewed from the correct position on the vertical axis, second surface 160 will obscure the projecting length of protrusion 250. When viewed at the correct horizontal and vertical position relative to device 100 only second surface 160 will be visible, obscuring the projecting length of protrusion 250 entirely.

Eyewear attachment 150 can also be comprised of protrusion 250 with the bridge of eyewear 90 being supported by protrusion 250.

Figure 5A:
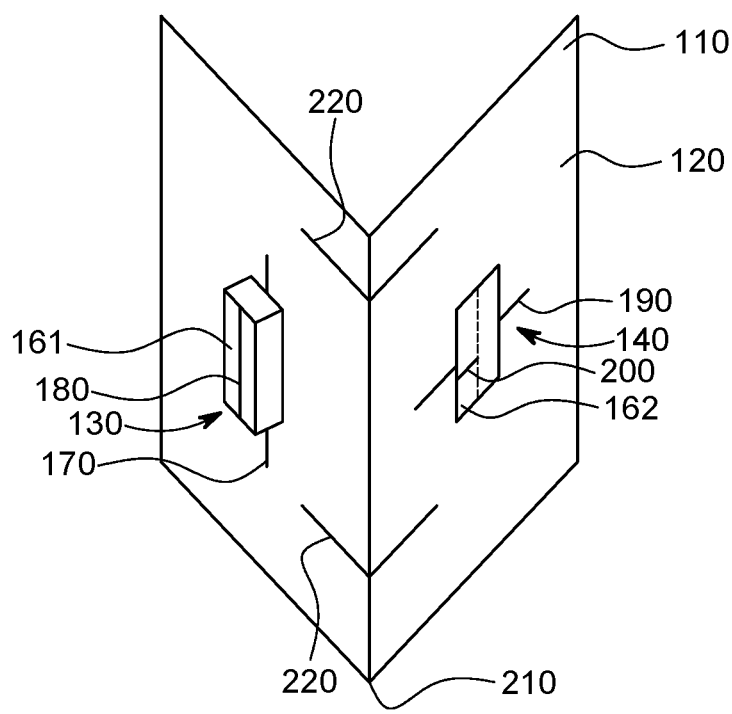
FIG. 5A is a perspective view and FIG. 5B a top view of an embodiment wherein the are multiple second surfaces.
Figure 5B:
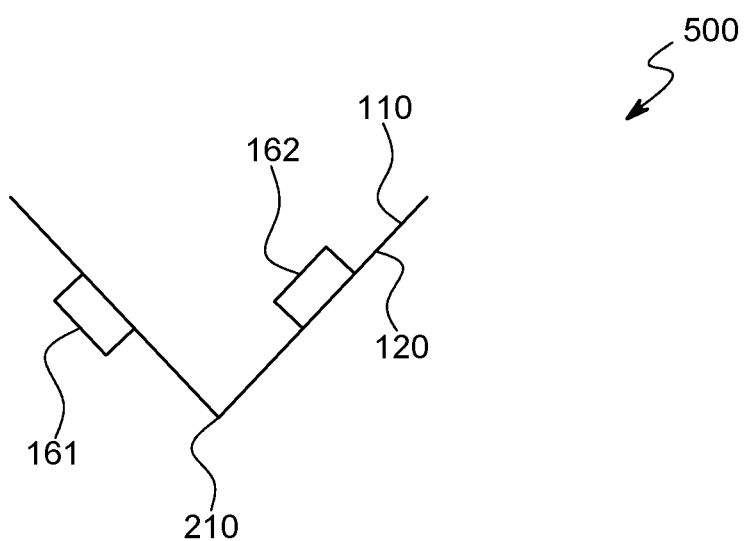

Reference is next made now to FIGS. 5A and 5B, which shows a perspective view and top view, respectively, of a device 500 comprising sheet 110 with bend 210, horizontal alignment indicator 130, vertical alignment indicator 140, distance indicators 220 and more than one second surface 161, 162. Device 500 provides an example of horizontal alignment indicator 130 using a raised surface 161 and vertical alignment indicator 140 using an inset surface 162. In other embodiments, horizontal alignment indicator 130 can be located on inset surface 162 and vertical alignment indicator 140 can be located on raised surface 161. Similar to the embodiments of FIGS. 1-4 a portion of the horizontal alignment indicator 130 or vertical alignment indicator 140 is located on front surface 120 and another portion is located on second surfaces 161, 162, respectively, and these portions will appear in alignment when viewed from the correct position.

Horizontal alignment indicator 130 can be comprised of first horizontal indicator line 170, which is vertical and may be parallel with bend 210, and second horizontal indicator line 180, which is vertical and located on raised surface 161.

Figure 6:
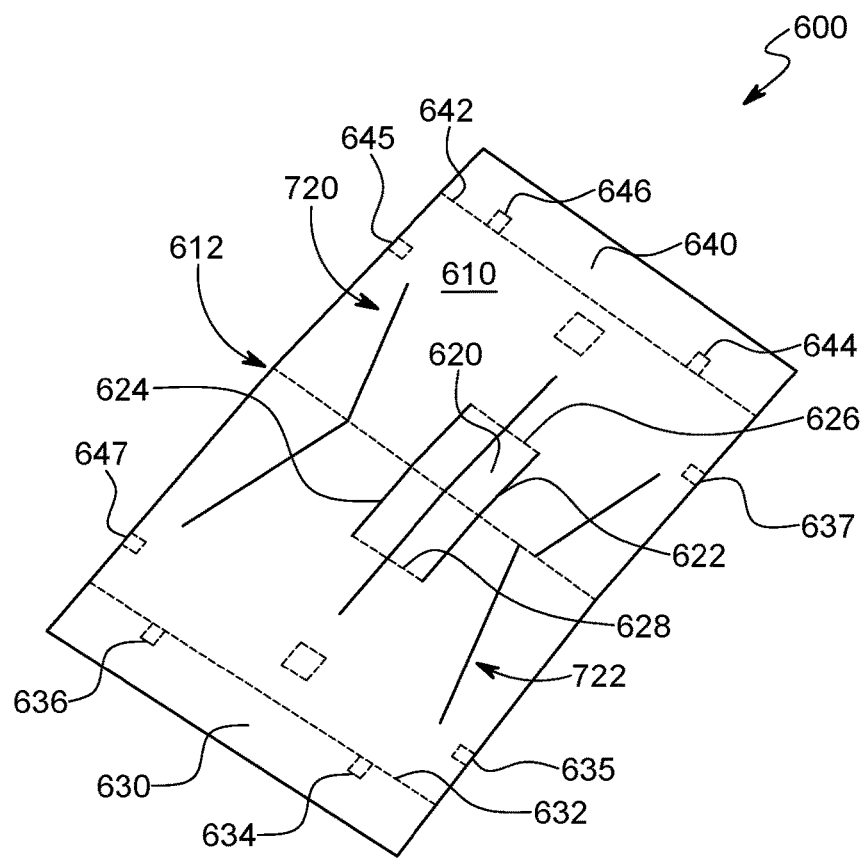
FIG. 6 is a perspective view of a kit that can be assembled into the device of FIG. 3 to provide assistance with obtaining an image of eyewear.

Reference is next made to FIG. 6, which illustrates a perspective view of a kit 600 that can be assembled to provide assistance with obtaining an image of eyewear from a position that will allow proper measurement of the eyewear. Kit 600 can be comprised of a flat sheet 610 that includes structures to assist a user to construct a device similar to that shown in FIG. 3. These structures can include perforations, cuts, cut-out sections, sections of weakness, sections of increased flexibility, among other structures, that will allow a user bend, shape, fold, or remove portions of flat sheet 610 to obtain the desired device. For example, flat sheet 610 can have a central spine 612 that provides flexibility to flat sheet 610 to allow flat sheet 610 to be bent.

Kit 600 can also have a second surface section 620 that is formed by two parallel cuts 622, 624 that cross central spine 612 and two folding lines 626, 628 running parallel on each side of central spine 612 between parallel cuts 622, 624. Central spine 612 can be folded in one direction to provide a V-shape and central spine 612 can then be folded in the inverse direction along second surface section 620 (between parallel cuts 622, 624) to provide a second surface that is inset into the V-shape, similar to the embodiment shown in FIG. 3.

Kit 600 can also include an angle fixation device that can be a separate element or formed from flat sheet 610. The embodiments of FIG. 6 provides an angle brace section 630 that can be removed from flat sheet 610 along brace perforation line 632 or by cutting along brace perforation line 632. Angle brace section 630 can include two notches 634, 636 that engage with mating notches 635, 637 on each side of central spine 612. These notches 634-637 can either be preformed cut-outs in flat sheet 610 or can be formed by perforations or areas of weakness in flat sheet 610 that would require the user to remove sections of flat sheet 612 to form notches 634-637. Similar preformed cut-outs or perforations can be used to define apertures for accepting the arms of eyewear 90.

When removed, angle brace section 630 can be used similarly to angle fixation device 231 of FIG. 3 to maintain bend along central spine 612 at a fixed angle to allow proper alignment of distance indicators 721, 722. Kit 600 can also include a second angle brace section 640, brace perforation line 642, and corresponding notches 644-647, which can be used similarly to angle brace section 630 on the opposite edge of flat sheet 610 to provide additional stability, if required.

Distance indicator 722 is provided as an example of a distance indicator where the two lines comprising distance indicator 722 do not intersect at central spine 612, and will appear as two parallel lines at the correct distance rather than a single straight line as would be the case with distance indicator 721. Horizontal alignment indicator can be provided by central spine 612 on front surface of sheet and second surface section 620, which can also include further markings.

Figure 7:
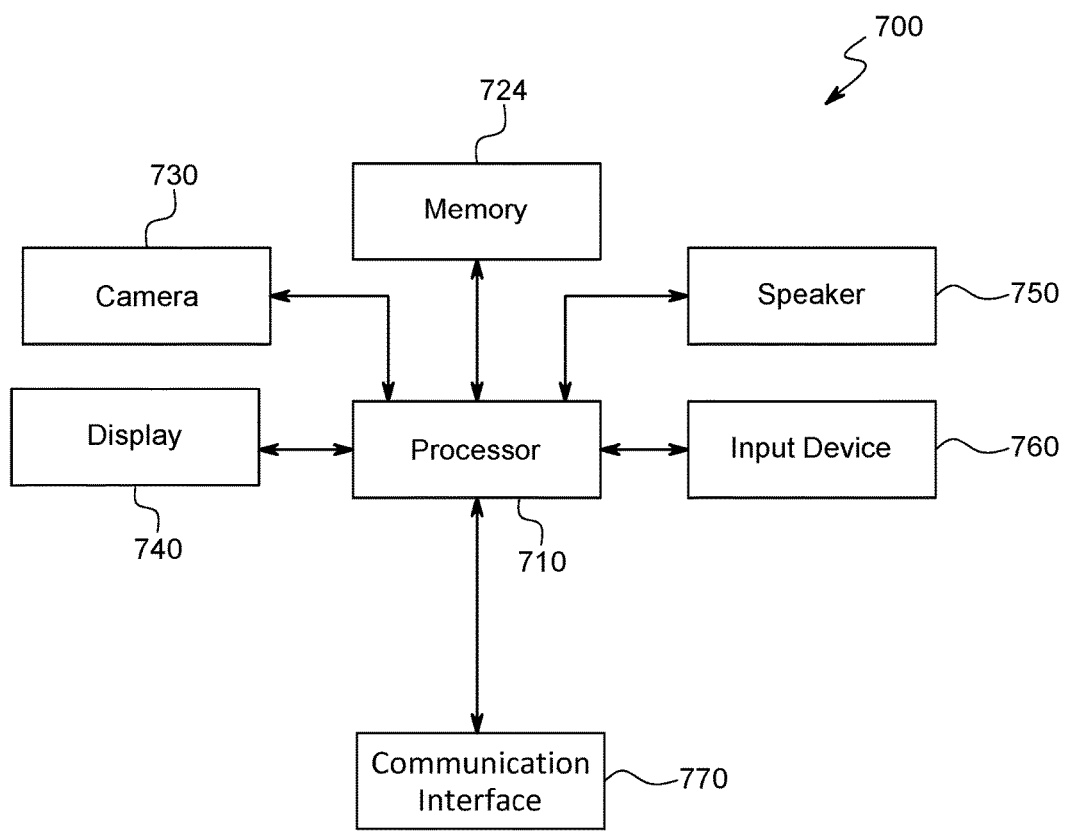
FIG. 7 is a block diagram of a mobile device having a camera that can be used with the devices of FIGS. 1-6 for capturing an image of eyewear for obtaining measurements.

Reference is next made to FIG. 7, shown is a block diagram of a mobile device 700 that can include a processor 710, a memory 724, a camera 730, a display 740, a speaker 750, and an input device 760. A communication interface 770 can be provided to allow mobile device 700 to communicate with other computing devices, either wired or wirelessly, or over a communication network. Communication interface 770 can include the charging port of mobile device 700, Wi-Fi, cellular networks, or Bluetooth. Mobile device 700 can execute programs stored in memory 724 using processor 710 to interact (receive input and output) from the other components illustrated in FIG. 7. Camera 730 can be positioned on the rear surface of mobile device 700, for example, in a smartphone embodiment. Processor 710 of mobile device 700 can control camera 730 to adjust focus of camera 730 and to continually capture images. Examples of mobile device 700 can include mobile computing devices, such as mobile phones, digital cameras, laptop computers or tablet computing devices.

Mobile device 700 can provide audio through speaker 750 and video through display 740. Alignment feedback can be provided to a user of mobile device 700 when capturing images of eyewear through use of speaker 750 and display 740. For example, audio prompts, such as "move left", "tilt downwards", etc., can be used to instruct a user how to position the mobile device 700 with respect to device 100, such as that shown in FIGS. 2-3, in order to assist with capturing an image of device 100 and eyewear 90 with the correct perspective. Display 740 can also provide visual user feedback, such as using arrows on the display 740, for example, that can indicate how to orient mobile device 100 with respect to device 100. In some embodiments, haptic feedback can also be provided through the use of a vibration motor (not shown) of the mobile device 700 to direct the user to an aligned position.

Users can interact and provide input to mobile device 700 through input device 760, which can include a keyboard, buttons, or a touch screen interface. Input received through input device 760 can be used to initiate capturing images of device 100 with affixed eyewear 90.

Figure 8:
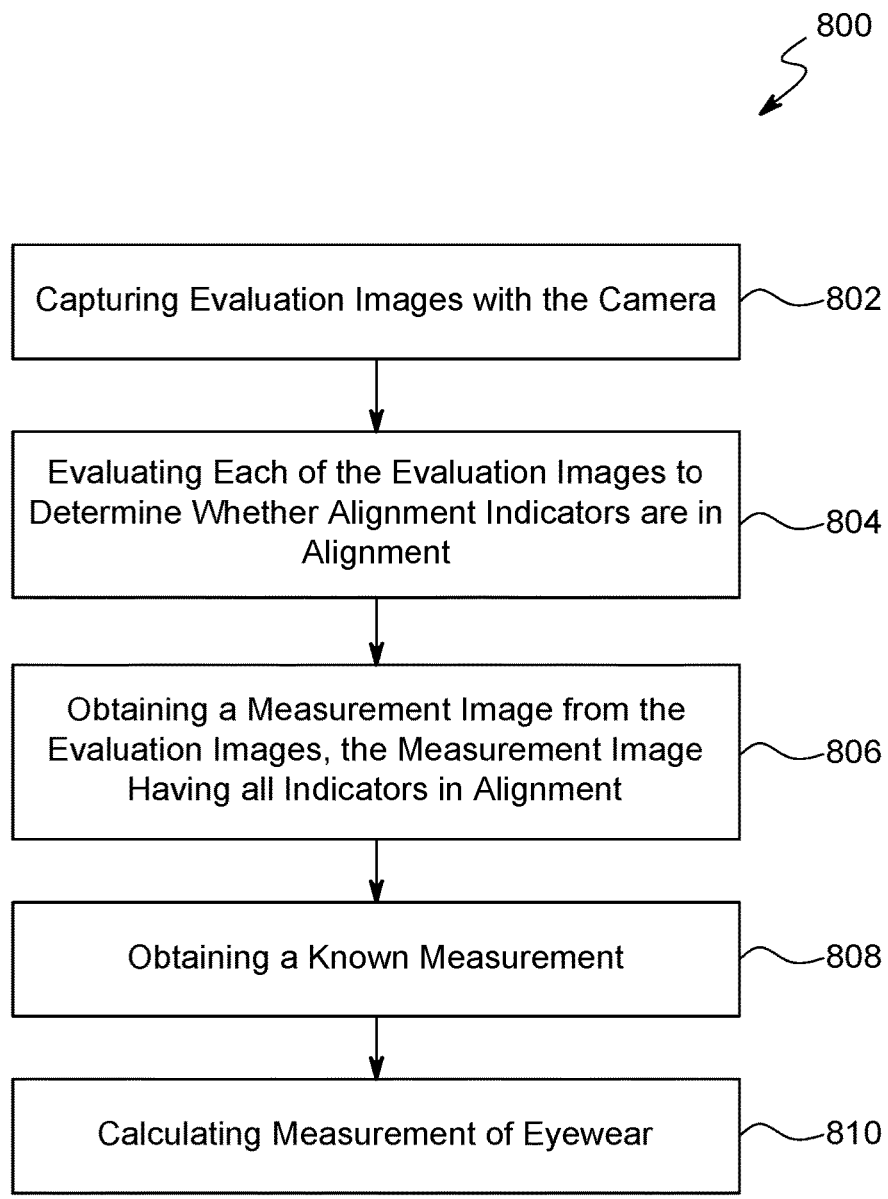
FIG. 8 is a flowchart diagram of a method of using a mobile device having a camera for obtaining a measurement image using an embodiment of the device described herein.

Referring now to FIG. 8, shown is a flowchart diagram of a method 800 of using a mobile device having a camera for obtaining a measurement image using an embodiment of the alignment device described above. A mobile device, such as mobile device 700 can be used to implement method 800 in conjunction with any one of the embodiments of device 100 illustrated in FIGS. 1-6 in order to obtain a measurement image of eyewear 90 that can be used to accurately calculate the eyewear dimensions.

Prior to starting method 800, device 100 is configured so that indicators (e.g. horizontal and vertical indicators) are visible and eyewear 90 is affixed to device 100. First step of method 800, at step 802, mobile device can capture one or more evaluation images using a camera. For example, mobile device 700 can continuously capture images or video to obtain a series of evaluation images using camera 730. Preferably, processor 710 of mobile device can monitor the output of camera 730 and can adjust the focus of camera 730.

Next, at step 804, each of the evaluation images are evaluated using a processor of the mobile device to determine whether alignment indicators are in alignment. As noted above, each indicator is made up of two separate portions, with each portion on separate surfaces of device 100, so that when an image is captured from the proper perspective, alignment indicators appear to be parallel or collinear (depending on configuration). Processor 710 can apply image processing algorithms to detect whether an alignment indicator is in alignment.

Processor 710 can also compare the degree of alignment of each alignment indicator with past evaluation images to determine whether the camera is moving in or out of alignment with respect to each alignment indicator. In some embodiments, feedback can be provided by mobile device 700 to direct movement of the mobile device to position mobile device 700 so that alignment indicators are in alignment. This can include auditory feedback through speaker 750, visual feedback provided on display 740, or haptic feedback provided by a motor of mobile device 700.

At step 806 a measurement image is obtained when all alignment indicators are in alignment. For example, processor 710 can be constantly evaluating a video stream provided by camera 730, and when a horizontal alignment indicator and vertical alignment indicator are in alignment, processor 710 can capture a measurement image and save this to memory 724.

In order to measure the eyewear 90, a known measurement can be obtained. This is accomplished in step 808 of method 800. In some embodiments, obtaining a known measurement can include prompting and collecting input of a known measurement of the eyewear 90. For example, an application executing on mobile device 700 can prompt a user to provide the A-frame measurement of eyewear 90, which is typically inscribed on the inner arm of the eyewear. Other embodiments can rely on the use of a distance indicator to ensure the measurement image is captured from the proper distance, and the known measurement can be obtained directly from the measurement image based on the size of features in the measurement image. Device 100 can also include a scale, such as a ruler scale, that can be used to assist with obtaining a known measurement from the measurement image.

Finally, at step 810, a measurement of the eyewear can be calculated. Typically, the measurement is related to the size and shape of the lenses. Processor 710 can take the measurement image and the known measurement in order to calculate the dimensions of the lenses of eyewear 90. In other embodiments, the measurement image and known measurement can be transmitted over communication interface 770 of mobile device 700 to a network connected server (e.g. another computing device having a processor and memory) that can perform the calculation step 810.

Manufacturers of custom eyewear modifications or additions can use device 100 and method 800 to obtain measurements of client's eyewear without physical access to the eyewear. For example, custom clip-on sunglasses can be perfectly sized for the eyewear. Using an online ordering system, a user can specify that they would like to purchase clip-ons for their prescription glasses and pay the fee. The manufacturer can then mail kit 600 to the user for the user to obtain a measurement image of their eyewear. When the user receives kit 600 in the mail, the user can assemble kit 600 into a device 100 and capture an image with the alignment indicators in alignment and provide this image back to the manufacturer. Using the measurement image, the manufacturer can create the custom clip-on's for the client's eyewear without ever having physical access to the eyewear. This saves additional shipping costs related to shipping the eyewear and the customer is not left without their eyewear.

Kit 600 can also include information about the customer and their order directly on sheet 610 so that the manufacturer can relate the image back to the customer's order. This information can be in plain text or encoded, such as using a bar code or QR code, for example. Kit 600 can also include assembly instructions to ensure the user can obtain device 100 from kit 600. In some embodiments, kit 600 can also contain instructions for the user to download an application to their smartphone to obtain the measurement image. The application can assist with instructions for the assembly of device 100 and properly affixing eyewear to device 100. Method 800, or at least some of its steps, can be carried out by the smartphone application. For example, mobile device 700 executing an application stored in memory 724 by processor 710 can be configured to constantly evaluate the images or video captured by the camera, provide feedback to the user to adjust orientation of the mobile device 700, and to finally capture a measurement image when all indicators on device 100 are in alignment. The measurement image can then be sent to the manufacturer along with information identifying the user or their order to the manufacturer.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A device for positioning eyewear to capture an image of the eyewear from a predefined horizontal alignment and a predefined vertical alignment, the image for obtaining measurements of the eyewear, the device comprising:
   a sheet having a front surface and a second surface that is not co-planar with the front surface;
   at least one horizontal alignment indicator (HAI), the horizontal alignment indicator (HAI) comprises a first HAI line and a second HAI line, the first HAI line is on the front surface and the second HAI line is on the second surface, wherein the first HAI line and the second HAI line of the horizontal alignment indicator are any one of parallel or collinear in the image when captured from the predefined horizontal alignment with respect to the device
   at least one vertical alignment indicator (VAI), the vertical alignment indicator (VAI) comprises a first VAI line and a second VAI line, the first VAI line is on the front surface and the second VAI line is on the second surface, wherein the first VAI line and the second VAI line of the vertical alignment indicator are any one of parallel or collinear in the image when captured from the predefined vertical alignment with respect to the device; and
   an eyewear attachment to position the eyewear adjacent to the front surface and the second surface of the sheet.

2. The device of claim 1 wherein the second surface is any one of: in front of or behind the front surface.

3. The device of claim 1 wherein the horizontal alignment indicator and the vertical alignment indicator are formed by a protrusion extending from the front surface of the sheet to an end of the protrusion, wherein the horizontal alignment indicator is the end of the protrusion which obscures the protrusion in a horizontal axis in the image when captured from the predefined horizontal alignment with respect to the device, and the vertical alignment indicator is the end of the protrusion which obscures the protrusion in a vertical axis in the image when captured from the predefined vertical alignment with respect to the device.

4. The device of claim 1 wherein the sheet has a bend at a fixed angle and at least one distance indicator.

5. The device of claim 4 further comprising an angle-fixation device that secures the bend at the fixed angle.

6. The device of claim 5 wherein the angle-fixation device comprises a brace having a first end portion and a second end portion opposite the first end portion, the first end portion attached to the sheet at a first predetermined position on one side of the bend and the second end portion attached to the sheet at a second predetermined position on an opposite side of the bend.

7. The device of claim 4 wherein the distance indicator comprises a first distance line and a second distance line on the front surface, the first distance line on one side of the bend and the second distance line on an opposing side of the bend, the first distance line and second distance line converge towards the bend, wherein the first distance line and the second distance line are any one of parallel or collinear in the image when captured from a predefined distance from the device.

8. The device of claim 1 wherein the eyewear attachment comprises two apertures formed in the sheet, each of the apertures on opposing sides of the horizontal alignment indicator, each of the apertures shaped to receive a corresponding arm of the eyewear.

9. The device of claim 8 wherein the eyewear attachment further comprises a bridge support formed by any one of a bridge aperture and a bridge protrusion.

10. The device of claim 1 further comprising an object having known dimensions wherein the known dimensions are used to calculate the dimensions of the eyewear.

11. A kit for assistance with positioning eyewear to capture an image of the eyewear from a predefined horizontal alignment and a predefined vertical alignment, the image for obtaining measurements of the eyewear, said kit comprising:

a flat sheet, the flat sheet having a front surface and a second surface that is formed from the flat sheet that is not co-planar with the front surface, the flat sheet having at least one horizontal alignment indicator (HAI), the horizontal alignment indicator (HAI) comprises a first HAI line and a second HAI line, the first HAI line is on the front surface and the second HAI line is on the second surface, wherein the first HAI line and the second HAI line of the horizontal alignment indicator are any one of parallel or collinear in the image when captured from the predefined horizontal alignment with respect to the flat sheet, and the flat sheet having at least one vertical alignment indicator (VAI), the vertical alignment indicator (VAI) comprises a first VAI line and a second VAI line, the first VAI line is on the front surface and the second VAI line is on the second surface, wherein the first VAI line and the second VAI line of the vertical alignment indicator are any one of parallel or collinear in the image when captured from the predefined vertical alignment with respect to the flat sheet; and an eyewear attachment to position the eyewear adjacent to the front surface of the flat sheet.

12. The kit of claim 11 wherein the flat sheet is bendable to a fixed angle, having at least one distance indicator, and an angle-fixation device to maintain a bend of the flat sheet at the fixed angle.

13. The kit of claim 12 wherein the flat sheet has the angle-fixation device and the angle-fixation device is removable from the flat sheet.

14. A method for using the device of claim 1, the method comprising:

capturing one or more evaluation images using a mobile device having a camera, the evaluation images for evaluating an alignment of the mobile device with respect to the device;

evaluating each of the evaluation images using a processor of the mobile device to determine whether any one or more of the horizontal alignment indicator and the vertical alignment indicator are in alignment;

obtaining a measurement image from the one or more evaluation images, the measurement image having each of the horizontal alignment indicator and the vertical alignment indicator in alignment; and obtaining a known measurement.

15. The method of claim 14 further comprising calculating the measurement of the eyewear, using the processor of the mobile device, using the measurement image and the known measurement.

16. The method of claim 14 further comprising sending the measurement image and the known measurement over a network to a computing device wherein the computing device has a processor for calculating the measurement of the eyewear using the measurement image and the known measurement.

17. The method of claim 14 further comprising providing feedback by the mobile device, the feedback to direct movement of the mobile device to have each of the horizontal alignment indicator and the vertical alignment indicator in alignment in at least one of the evaluation images.

18. The method of claim 17 wherein the feedback is any one of visual feedback provided by a display of the mobile device, auditory feedback provided by a speaker of the mobile device, haptic feedback provided by a motor of the mobile device.

19. The method of claim 14 wherein obtaining the known measurement further comprises prompting and collecting input of the known measurement at the mobile device.

20. The method of claim 19 wherein the known measurement is an A-frame measurement of the eyewear.

* * * * *